(12) United States Patent
Wynn et al.

(10) Patent No.: US 9,344,908 B2
(45) Date of Patent: May 17, 2016

(54) SYSTEMS AND METHODS FOR QUALITY OF EXPERIENCE MEASUREMENT AND WIRELESS NETWORK RECOMMENDATION

(71) Applicant: Devicescape Software, Inc., San Bruno, CA (US)

(72) Inventors: Simon Wynn, Redwood City, CA (US); John Gordon, Alameda, CA (US)

(73) Assignee: Devicescape Software, Inc., San Bruno, CA (US)

( * ) Notice: Subject to any disclaimer, the term of this patent is extended or adjusted under 35 U.S.C. 154(b) by 25 days.

(21) Appl. No.: 14/106,631

(22) Filed: Dec. 13, 2013

(65) Prior Publication Data

US 2014/0179238 A1 Jun. 26, 2014

Related U.S. Application Data

(60) Provisional application No. 61/737,082, filed on Dec. 13, 2012.

(51) Int. Cl.
*H04W 24/08* (2009.01)
*H04L 12/24* (2006.01)
*H04L 12/26* (2006.01)

(52) U.S. Cl.
CPC ........... *H04W 24/08* (2013.01); *H04L 41/5067* (2013.01); *H04L 43/10* (2013.01); *H04L 43/0864* (2013.01)

(58) Field of Classification Search
None
See application file for complete search history.

(56) References Cited

U.S. PATENT DOCUMENTS

| 5,933,849 | A | 8/1999 | Srbljic et al. | |
|---|---|---|---|---|
| 6,658,000 | B1 * | 12/2003 | Raciborski et al. | 370/386 |
| 8,191,124 | B2 | 5/2012 | Wynn et al. | |
| 8,196,188 | B2 | 6/2012 | Wynn et al. | |
| 8,549,588 | B2 | 10/2013 | Wynn et al. | |
| 2004/0210632 | A1 * | 10/2004 | Carlson et al. | 709/203 |
| 2005/0265240 | A1 * | 12/2005 | Jain et al. | 370/241 |
| 2008/0316936 | A1 | 12/2008 | Enomoto | |
| 2009/0094361 | A1 | 4/2009 | Srinivasan | |
| 2011/0319071 | A1 * | 12/2011 | Beppler et al. | 455/424 |
| 2012/0003976 | A1 * | 1/2012 | Bhat et al. | 455/436 |
| 2012/0204243 | A1 | 8/2012 | Wynn et al. | |

OTHER PUBLICATIONS

Biaz, Saad et al, "Rate Adaptation Algorithms for IEEE802.11 Networks: A Survey and Comparison," IEEE Symposium on Computers and Communications (ISCC 2008), ISBN No. 978-1-4244-2703-1, pp. 130-136, Jul. 2008.
International Application No. PCT/US2013/075159, International Search Report and Written Opinion mailed Apr. 10, 2014.

* cited by examiner

*Primary Examiner* — Alejandro Rivero
(74) *Attorney, Agent, or Firm* — Sheppard, Mullin, Richter & Hampton LLP

(57) ABSTRACT

Systems and methods for quality of experience measurement and wireless network recommendation are disclosed. In some embodiments, a method comprises connecting to a non-cellular wireless data network, the digital device capable of communicating over a cellular network, transmitting a plurality of pings to a QoE system accessible over the non-cellular wireless data network, receiving a set of ping responses from the QoE system in response to the plurality of pings, calculating a QoE score based on the set of ping responses, and determining whether to maintain connectivity with the non-cellular wireless data network based on the QoE score.

27 Claims, 14 Drawing Sheets

SYSTEMS AND METHODS FOR QUALITY OF EXPERIENCE MEASUREMENT AND WIRELESS NETWORK RECOMMENDATION

CROSS-REFERENCE TO RELATED APPLICATION

The present application claims benefit of U.S. Provisional Patent Application No. 61/737,082 filed Dec. 13, 2012, and entitled "Systems and Methods for Quality of Service (QoS) Metrics," which is incorporated herein by reference.

BACKGROUND

1. Field of the Invention

The present invention generally relates to measuring a quality of experience on a wireless network. More particularly, the invention relates to measuring a quality of experience on a wireless network and making network recommendations based on the measurements.

2. Description of Related Art

The increasing use of the networks to access information has resulted in a greater dependence on network communication for a variety of activities. With this dependence comes the growing expectation that network access will be ubiquitous. Network access for mobile users has been particularly enhanced by improvements in wireless technology.

Unfortunately, assessing the quality of a wireless network consumes resources on mobile devices as well as the wireless network. As a result, assessing the quality of a wireless network may cause the quality of the network to diminish and result in unnecessary data traffic. For example, traditional "speed test" type applications assess quality by downloading and uploading large amounts of data, and hence do not scale well, incur data traffic costs, and could affect other users of the network by swamping the backhaul data connection to a Wi-Fi access point.

SUMMARY

Systems and methods for quality of experience measurement and wireless network recommendation are disclosed. In some embodiments, a method comprises connecting to a non-cellular wireless data network, the digital device capable of communicating over a cellular network, transmitting a plurality of pings to a QoE system accessible over the non-cellular wireless data network, receiving a set of ping responses from the QoE system in response to the plurality of pings, calculating a QoE score based on the set of ping responses, and determining whether to maintain connectivity with the non-cellular wireless data network based on the QoE score.

Each of the plurality of pings may be formatted using the user datagram protocol (UDP). The set of ping responses are measured to determine round trip times based on the transmission of the plurality of pings. Determining whether to maintain connectivity with the non-cellular wireless data network based on the QoE score may comprise providing a network response to assist in terminating connectivity with the non-cellular wireless data network based on the QoE score. Further, determining whether to maintain connectivity with the non-cellular wireless data network based on the QoE score may comprise removing a listing of the non-cellular wireless data network from a list of available networks.

Determining whether to maintain connectivity with the non-cellular wireless data network based on the QoE score may comprise determining that a quality of the non-cellular wireless data network is satisfactory. Calculating the QoE score based on the set of ping responses may comprise calculating a ping score based, at least in part, on a standard deviation and average of round trip times associated with the set of ping responses. Further, calculating the ping score may comprise the standard deviation divided by the average which may remove or reduce offsets caused by fixed network latency due to the number of network hops from the digital device to the QoE system.

In some embodiments, calculating the QoE score based on the set of ping responses comprises calculating a link score based on a link speed, for example the 802.11 data rate, and a maximum link threshold value chosen to represent a value equal of or approximately equal to an acceptable link speed between the digital device and a network device which provides the digital device access to the non-cellular wireless data network. Further, calculating the QoE score based on the set of ping responses may comprise calculating the QoE score based on a ping score and a link score, wherein the ping score, the ping score being based, at least in part, on a standard deviation and average of round trip times associated with the set of ping responses.

In some embodiments, the method may further comprise calculating a plurality of QoE scores based on a plurality of ping transmissions and a plurality of sets of ping responses, the plurality of sets of ping responses being based on the plurality of ping transmissions. The method may further comprise comparing a subset of the QoE scores to a failure count threshold, if a sufficient number of the subset of QoE scores are unsatisfactory based on the comparison with the failure count threshold, providing a network response to assist in terminating connectivity with the non-cellular wireless data network based on the comparison. The method may further comprise comparing a subset of the QoE scores to a failure count threshold, if a sufficient number of the subset of QoE scores are unsatisfactory based on the comparison with the failure count threshold, providing network response to assist in terminating connectivity with the non-cellular wireless data network based on the comparison.

An exemplary system comprises a communication interface, a ping module, a QoE score module and a network response module. The communication interface may be configured to assist in connecting to a non-cellular wireless data network and a cellular wireless network. The ping module may be configured to transmit a plurality of pings to a QoE system accessible over the non-cellular wireless data network and receive a set of ping responses from the QoE system in response to the plurality of pings. The QoE score module may be configured to calculate a QoE score based on the set of ping responses. The network response module may be configured to determine whether to maintain connectivity with the non-cellular wireless data network based on the QoE score.

An exemplary non-transitory computer readable medium may comprise executable instructions. The instructions may be executable by a processor to perform a method. The method may comprise connecting to a non-cellular wireless data network, the digital device capable of communicating over a cellular network, transmitting a plurality of pings to a QoE system accessible over the non-cellular wireless data network, receiving a set of ping responses from the QoE system in response to the plurality of pings, calculating a QoE score based on the set of ping responses, and determining whether to maintain connectivity with the non-cellular wireless data network based on the QoE score.

DETAILED DESCRIPTION

Figure 1:
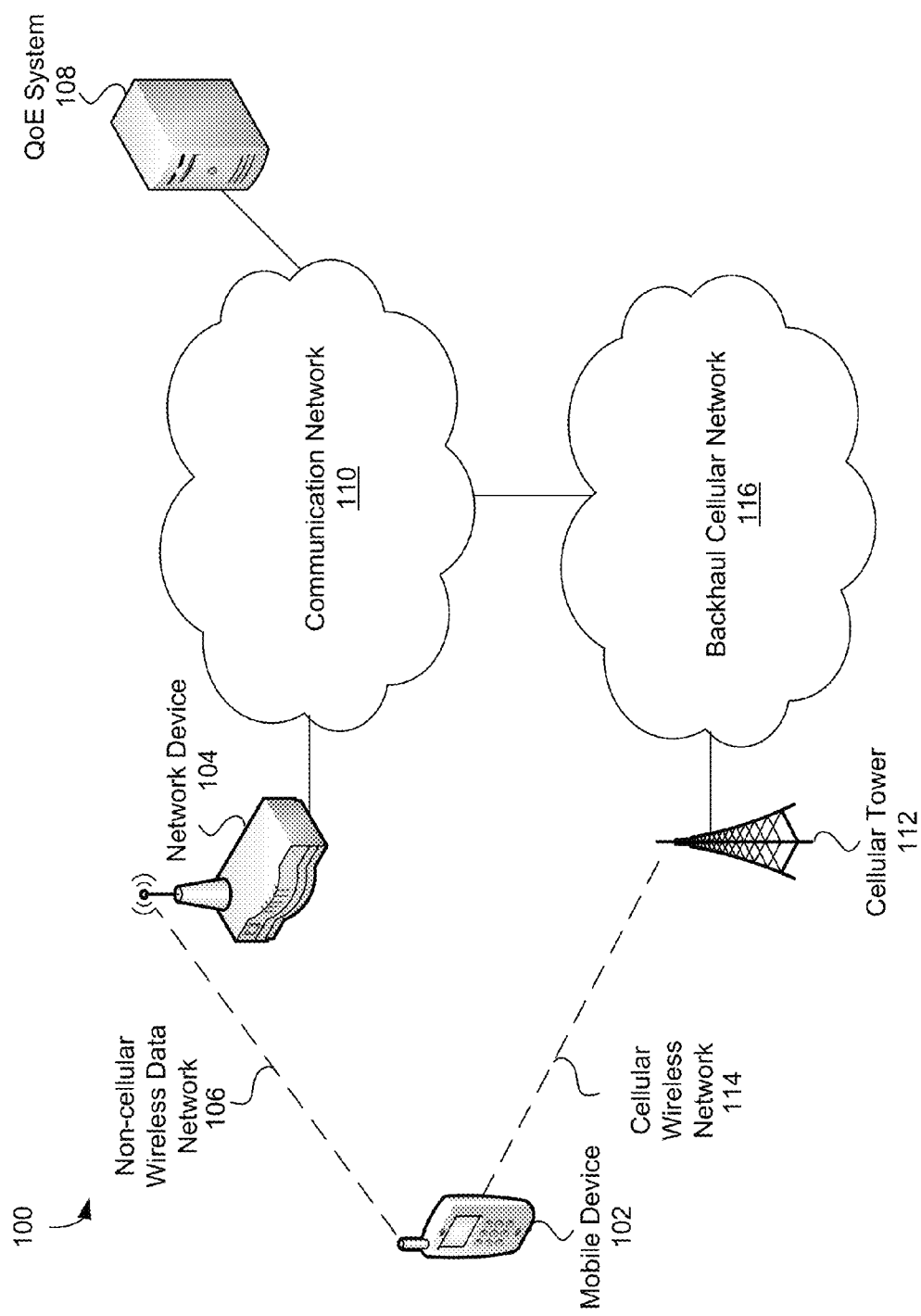
FIG. 1 illustrates a diagram of an environment in which some embodiments may be practiced.

Some embodiments described herein include a method for measuring congestion, jitter, packet loss, and/or signal quality on a wireless network (e.g., a Wi-Fi network) without passing large amounts of traffic in order to predict an acceptable user experience for a user. In various embodiments, the method may utilize bursts of ping traffic (e.g., UDP traffic) to predict congestion. The congestion, for example, may be on a medium to low bandwidth back-haul networks based on empirical calibration.

In some embodiments, the effect of fixed network latency is reduced or attenuated. Fixed network latency may be a function of the number of network hops as a result of geographical distance to another computer such as a server. The fixed network latency may be normalized out of ping measurements, leaving the variable latency represented as jitter. In one example, the fixed network latency is normalized out of the ping measurements by taking a standard deviation of timed ping results and dividing the standard deviation by the average of the timed ping results.

In some embodiments, the method further comprises taking measurements of one or more wireless network link speeds (e.g., Wi-Fi data rates, which are part of the IEEE 802.11 Multi-rate support) to determine the quality of the wireless network. A wireless network link speed may indicate the approximate distance of a digital device (e.g., a cell phone with Wi-Fi connectivity) to a network device (e.g., access point), the network packet loss, and RF signal to interference and noise ration (SINR). The wireless network link speed may assist to predict quality and/or throughput of the wireless network.

A method may utilize ping traffic measurement and/or one or more wireless network link measurements to calculate a quality of experience (QoE) of a wireless network. In some embodiments, the calculation of the QoE is compared to a QoE threshold to determine if the wireless network is of sufficient quality or insufficient quality (e.g., to assign a passing or failing quality score). Any number of QoE calculations may be utilized to determine if a digital device (e.g., a smart phone) should be on a cellular network or a wireless data network (e.g., a Wi-Fi network).

In some embodiments, any number of QoE calculations may be compared to a quality threshold with a failure count applied. A number of consecutive failures (where the QoE value falls below the quality threshold) may occur before any transition to and from the cellular network occur. The failure count can be non-symmetric to make the evaluation of the network prior to transitions more or less forgiving. For example, the failure count may be utilized in determining the quality threshold to make the threshold more forgiving as a user enters a location with Wi-Fi and transitions from cellular to Wi-Fi. The failure count may also be utilized to make the failure count threshold less forgiving when the user leaves the location.

In some embodiments, the quality threshold is dynamically adjusted based on any number of factors. The threshold, for example, may be continuously dynamically adapted or between any number of settings (e.g., between two fixed settings) based on measurements of cellular signal quality, wireless network quality, and/or the hardware of the digital device (e.g., smartphone).

FIG. 1 illustrates a diagram of an environment 100 in which some embodiments may be practiced. In various embodiments, a mobile device 102 may be in communication with a network device 104 over a non-cellular wireless data network 106. The mobile device 102 may also be in communication with a cellular tower 112 over a cellular wireless network 114. A mobile device 102 may be any digital device capable of wireless communication over both cellular and non-cellular wireless networks. A digital device may be any device with a processor and memory. The mobile device 102 may be, for example, a cell phone, smart phone, media device, laptop, or the like. In some embodiments, the mobile device 102 comprises two antennas, one for receiving and transmitting signals with the non-cellular wireless data network 106 and one for receiving and transmitting signals over the cellular wireless network 114.

In various embodiments, a user with the mobile device 102 may access the communication network 110 over a hotspot (e.g., over the non-cellular wireless data network 106 and the network device 104). The mobile device 102, for example, may be a smartphone with both cellular connectivity (e.g., with services provided by a mobile network operator) and non-cellular connectivity (e.g., the mobile device 102 may have Wi-Fi access to access the communication network 110). In one example, the mobile device 102 obtains permission from the network device 104 to access the communication network 110. The mobile device 102 may also have access to the backhaul cellular network 116 over the cellular wireless network 114. In another example the communication network 110 is the Internet.

The network device 104 is an access device such as an access point, router or bridge that can allow communication between devices operationally coupled to the network device 104 with devices coupled to the communication network 110. The network device 104 may require that digital devices be authorized or approved before providing permission to communicate with the communication network 110. In various embodiments, the network device 104 may comprise one or more open ports that allow communication (e.g., data formatted in a DNS protocol) with the communication network 110.

The non-cellular wireless data network 106 may be any data network including, for example, any wireless local area network based on the IEEE 802.11 standards. The cellular network 114 is any network supported by a mobile network operator such as a telecommunications provider that utilizes a wireless network (e.g., based on the 3GPP standards) distributed over land areas served by a cellular tower 112.

The cellular tower 112 is any tower that may provide the mobile device 102 access to the backhaul cellular network 116. In some embodiments, the mobile device 102 communicates over a telecommunications network (e.g., the cellular wireless network and the backhaul cellular network 116) to send data to and receive data from the communication network 110 (e.g., to send to and receive from the Internet). The backhaul cellular network 116 may comprise a core network and intermediate links that may be provided by a telecommunications provider.

In various embodiments, after the mobile device 102 has obtained permission by the network device 104 to access to the communication network 110, the mobile device 102 may determine a quality of experience of data communication.

In one example, a user with a mobile device 102 enters a hotspot. Without previously authenticating or obtaining permission from the network device 104 to access the communication network 110, the mobile device 102 may automatically transmit a credential request as a standard protocol (e.g., formatted in a DNS protocol) over the non-cellular wireless data network 106 to the network device 104. The credential request may identify the network device 104 and/or the non-cellular wireless data network. The network device 104 may receive the credential request at an open port which allows the credential request to be provided to a credential server (not depicted) over the communication network 110. In some embodiments, the QoE System 108 is the credential server.

The credential server may receive the credential request and retrieve network credentials (e.g., a username and password) based, at least in part, on at least some of the information contained within the credential request (e.g., based on the identified network device 104). The credential server may provide a credential request response (e.g., formatted in a DNS protocol) which may include the network credentials back to the mobile device 102. In one example, the credential request response may be provided back over the open port of the network device 104 and subsequently provided to the mobile device 102 over the non-cellular wireless data network.

The mobile device 102 may retrieve network credentials from the credential request response and provide the network credentials to the network device 104 over the non-cellular wireless data network. The network device 104 may authenticate and/or verify the credentials. If approved, the network device 104 may authorize access of the mobile device 102 to the communication network 110. The process of obtaining network credentials, providing the network credentials to the requesting device, and providing the network credentials to the network device 104 is further described by U.S. Pat. No. 8,549,588, entitled "System and Method for Obtaining Network Access," issued Oct. 1, 2013, U.S. Pat. No. 8,196,188, entitled "System and Method for Providing Network Credentials," issued Jun. 5, 2012, and U.S. Pat. No. 8,191,124, entitled "System and Method for Acquiring Network Credentials," issued May 29, 2012, which are all incorporated by reference herein.

Although the hotspot in FIG. 1 depicts separate a QoE System 108 coupled to the communication network 110, those skilled in the art will appreciate that there may be any number of devices (e.g., servers, digital devices, access controllers, and network devices) coupled to the communication network 110. Similarly, there may be any number of network devices, mobile devices, and/or cellular towers.

It should be noted that FIG. 1 is exemplary. Alternative embodiments may comprise more, less, or functionally equivalent components and still be within the scope of present embodiments. For example, as previously discussed, the functions of the QoE System 108 may be split into any number of servers. Further, the QoE System 108 may perform additional functionality. For example, the QoE System 108 may receive credential requests from one or more mobile devices and return credential request responses.

Figure 2:
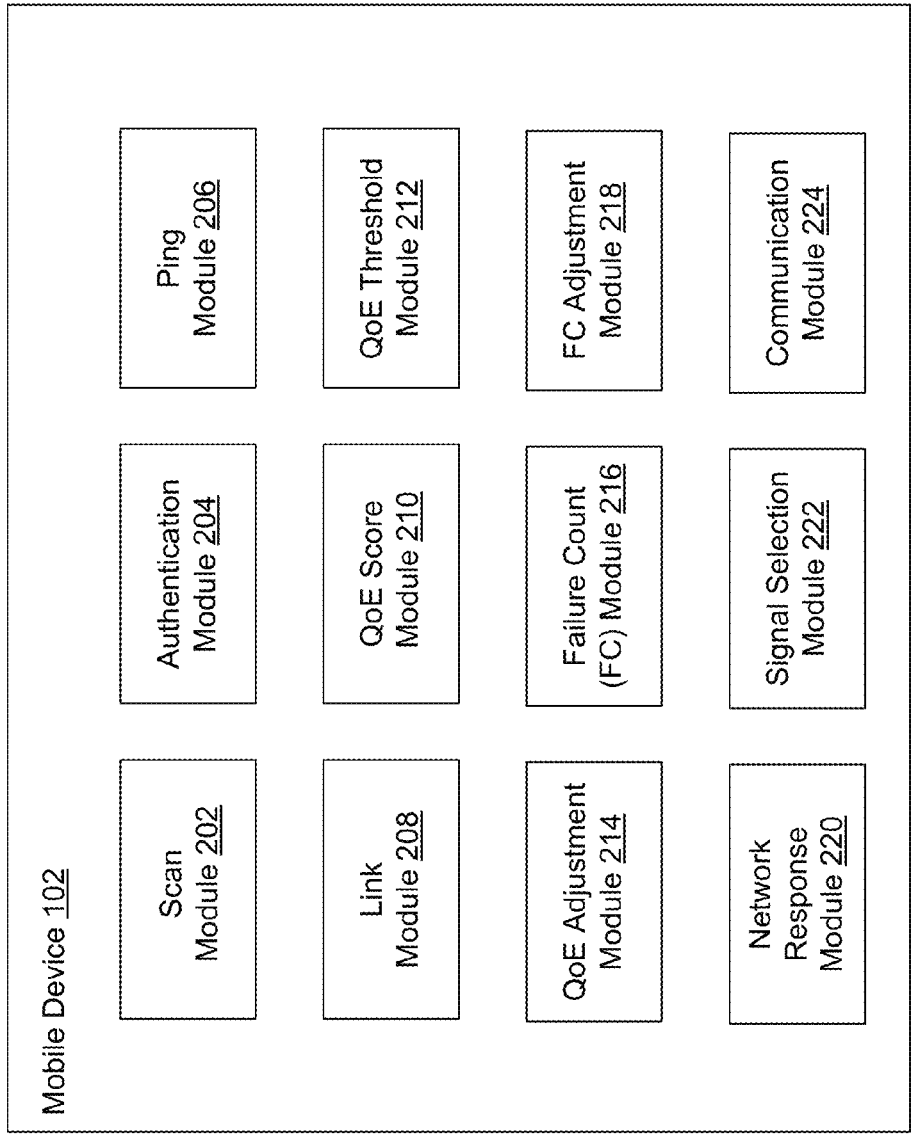
FIG. 2 is a block diagram of a mobile device in some embodiments.

FIG. 2 is a block diagram of a mobile device 102 in some embodiments. The mobile device may comprise a scan module 202, an authentication module 204, a ping module 206, a link module 208, a QoE score module 210, a QoE threshold module 212, a QoE adjustment module 214, a Failure Count (FC) module 216, an FC adjustment module 218, a network response module 220, a signal selection module 222, and a communication module 224.

The scan module 202 may be configured to scan an area for available non-cellular wireless data network such as a non-cellular wireless data network 106. In one example, the scan module 202 scans an area for wireless access points (e.g., hotspots) or any other network devices such as network device 104. The scan module 202 may receive network identifiers that identify the network device 104 over the non-cellular wireless data network 106. In various embodiments, the scan module 202 may be a part of an operating system of the mobile device 102.

The authentication module 204 may be configured to obtain permission from the network device 104 to access the communication network 110. In some embodiments, the authentication module 204 receives a username, password, and/or other information (e.g., acceptance of terms and conditions) from a user of the mobile device 102 and provides the information to the network device 104 to obtain permission to access the communication network 110.

In some embodiments, the authentication module 204 provides a credential request to a credential server, receives a credential request response from the credential server, retrieves network credentials from the credential request response, and provides the network credentials to the network device 104.

The ping module 206 may transmit a plurality of pings to a server (e.g., the QoE system 108) over the communication network 110, receive a set of ping responses, and calculate a ping score. In one example, the ping module 206 transmits the pings to the QoE system 108 on the communication network 110 using the communication module 224. The QoE system 108 may provide a set of ping responses back to the mobile device 102. Each ping response may be measured to determine a ping time (e.g., a roundtrip timestamp). In various embodiments, the QoE system 108 is an echo server.

The ping module 206 may determine a ping score based on the transmission of plurality of pings and the set of ping responses. The ping module 206 may calculate the ping score in any number ways.

In some embodiments, the ping module 206 determines an average of the ping times from the set of ping responses (e.g., a time average based on timestamps). The ping module 206 may further determine a standard deviation from the set of ping responses (e.g., a standard deviation based on timestamps). The ping module 206 may also identify the number of pings transmitted (e.g., packets sent) as well as the number of ping responses received (e.g., packets received).

A ping score may be calculated as follows:

Ping Score=(1−(standard deviation/ping average))* (packets received/packets sent)

In various embodiments, the ping score may be weighted by a multiplying the ping score with a ping weight. In various embodiments, after testing the ping score calculations, a ping weight of 0.6 may be used. Those skilled in the art will appreciate that any ping weight may be used.

Those skilled in the art will appreciate that the calculation of the ping standard deviation divided by the ping average may remove at least some variations in ping times which may be caused by fixed network latency based on the location of the mobile device 102 relative to the QoE system 108 (e.g., relative to the data center hosting the QoE system 108).

The link module 208 may determine a link score based on the link speed. The link module 208 and the link score may be optional. The link speed may be related to packet loss, signal fading and SINR (signal to interference and noise ratio). The link speed may be related to the distance between the mobile device 102 and the network device 104 based on range vs. rate algorithms. Those skilled in the art may utilize any range vs. rate algorithms including those in the IEEE 802.11 standards (See Saiid Biaz, Shaoen Wu, "Rate Adaptation Algorithms for IEEE802.11 Networks: A Survey and Comparison," IEEE Symposium on Computers and Communications, pp. 130-136, July 2008).

The link module 208 may determine a link maximum and a link speed. The link speed may be the maximum data rate of the link and may be determined by various rate adaption algorithms which base the resulting data rate value on packet loss, signal fading and/or RF SINR. The link maximum may be the maximum expected link speed.

The link score may be calculated as follows:

Link Score=minimum((link speed/link maximum), 1.0)

Where 'minimum' may mean the lower value of either 1, or the result of link speed divided by link maximum.

In various embodiments, the link score may be weighted by a multiplying the link score with a link weight. In various embodiments, after testing the link calculations, a link weight of 0.4 may be used. Those skilled in the art will appreciate that any ping weight may be used.

The QoE score module 210 may calculate a QoE score to determine whether, in some embodiments, communication between the mobile device 102 with devices over the non-cellular wireless data network 106, network device 104, and communication network 110 is of sufficient quality. The QoE score module 210 may calculate a QoE score based on the ping score. In some embodiments, the QoE score module 210 may calculate the QoE score based on the ping score and the link score.

The QoE score may be calculated as follows:

QoE Score=minimum((ping score+link score)/(ping weight+link weight),1.0)

If there is no ping weight or link weight, the ping weight+ link weight may be assumed to be equal to one. In various embodiments, the ping score and the link score are summed together. The ping score and the link score may be a part of a function and not necessarily added together. In some embodiments, the QoE score is based, in part, on multiplying the ping score with the link score instead of summing the two values.

Those skilled in the art will appreciate that the QoE score may be determined in any number of ways.

In some embodiments, the QoE score may yield a score between 0 and 1 with, for example, 1 being excellent. The QoE score maybe used to determine a quality of the network.

In another embodiment the ping score and link score are not combined to create one QoE score but rather represent two separate QoE scores with two separate thresholds. In one example, the digital device can be configured to require one or both QoE thresholds to be satisfied to continue the use of the non-cellular wireless data network 106.

The QoE score module 210 or the QoE threshold module 212 may compare the QoE score with a QoE threshold to determine if a network is of sufficient quality. For example, if the QoE score is below the QoE threshold, the QoE score module 210 or the QoE threshold module 212 may determine that the network is of insufficient quality.

The optional QoE adjustment module 214 may adjust the QoE threshold. The QoE threshold may be adjusted in many different ways for different reasons. In some embodiments, the QoE adjustment module 214 may adjust the threshold based on user configurations (e.g., to demand higher quality connections or to allow for lower quality connections).

In some embodiments, the QoE adjustment module 214 may adjust the QoE threshold based on the quality of the cellular wireless network 114. For example, if the cellular wireless network 114 is an LTE network, which typically offer high performance, the QoE adjustment module may adjust the QoE threshold to require higher quality connectivity so the user may receive comparable non-cellular performance to that of the cellular wireless network 114. In another example, if the cellular wireless network 114 is of low speed or quality, the QoE adjustment module may adjust the QoE threshold to allow for lower quality connectivity.

In some embodiments, the QoE threshold may also be dynamic and part of an adaptive system. In this case, the QoE adjustment module 214 may determine the overall QoE threshold for Wi-Fi connections. In some embodiments, to avoid any cellular traffic created during a cellular QoE type test (and resulting cellular signaling), the cellular technology type may be assigned a weighting and applied to an adaptive QoE threshold algorithm. For example, the following weights may be applied to cellular technology types:

2G=2
3G=5
4G=9

The QoE score algorithm used for Wi-Fi quality assessment may return a value between 0 and 1.0. Using these cellular technology type weightings, the QoE threshold may be derived as (Technology type)/10. For 2G networks for example, any Wi-Fi QoE score greater than 0.2, for example, may result in the non-cellular wireless data network 106 connection being used, since 2G cellular data networks would likely be much slower than Wi-Fi. Conversely, for 4G networks (for example LTE), the Wi-Fi QoE score may be required to equal or be greater to 0.9, for example, for the connection to be considered usable since 4G networks operate at data rates that sometime exceed those of Wi-Fi networks.

Cellular networks also provide data that indicates directly or indirectly the actual quality of the data service. For example, LTE (Long Term Evolution/4G) networks implement link adaptation where the mobile handset reports to the eNodeB (base station) the Channel Quality Index, or CQI. This value may be used to determine the cellular modulation scheme and code rate that best suits the signal to interference plus noise ratio (SINR). Since the CQI is a direct indicator of the cellular data connection quality, it may be used to determine an adaptive QoE threshold for Wi-Fi connections.

For example, CQI values may range from 0 to 15, where 15 is the best possible connection quality. In this case an adaptive QoE threshold may be derived as follows:

QoE threshold=$CQ1*(⅔)$

In this case, the best possible LTE connection may block any possible Wi-Fi connections, and decreasing LTE quality may lower the threshold to zero, allowing all Wi-Fi connections without making any selection choices based on the QoE score.

In some embodiments, cellular signal strength, for example Reference Signal Received Power (RSRP) and Signal to Inference and Noise Ration (SINR) are used to determine LTE quality. Those skilled in the art will appreciate that there are many cellular technologies and cellular measurement values that can be used to determine cellular network quality.

The failure count (FC) module 216 may calculate a number of times the QoE score indicates insufficient quality (e.g., when compared to the QoE threshold). In one example, the FC module 216 determines the number of consecutive QoE scores that indicate that network connectivity is of insufficient quality. In another example, the FC module 216 determines the number of QoE scores that indicate that network connectivity is of insufficient quality over a predetermined period of time (e.g., 5 minutes).

Those skilled in the art will appreciate that there are many ways that the FC module 216 may calculate the significance of sufficient or insufficient quality.

The FC module 216 may be configured to compare the failure count (i.e., the number of times the QoE is found to be of insufficient quality when compared to the QoE threshold) to a FC threshold. The FC module 216 may compare consecutive failures to the FC threshold or may compare failures over a predetermined period (e.g., 3 minutes) to the FC threshold.

The optional FC adjustment module 218 module may change the FC threshold to adjust the number of times a QoE failures can be seen before a determination, recommendation, or switch back to the cellular wireless network (e.g., from an unsatisfactory non-cellular wireless data network 106) is initiated. The FC threshold may be adjusted to make a user's mobile device 102 more forgiving as a user walks into a venue that provides Wi-Fi (e.g., since the signal strength and hence quality could be initially poor as they approach), and then adjusts the FC threshold to be less forgiving once a connection has been deemed of acceptable quality. The user is, for example, now in the venue, using the non-cellular wireless data network 106, and as they leave, the handset may be less forgiving about quality. As a result, the handset may move back to the cellular data network 114 after fewer consecutive failures.

Those skilled in the art will appreciate that an Internet connection, especially a wireless one, may experience very short connectivity issues, as can the Internet itself. A short interruption in connectivity may be due to a network issue, or may be due to brief lack of RF coverage in a building. As a result of interruptions in connectivity, QoE score measurement may determine a quality failure; if a mobile device 102 is disconnected immediately, the benefit of the non-cellular wireless data network 106 connection may be lost once this brief connectivity issue was resolved. In some embodiments, the QoE threshold makes sure the "n" successive tests are performed before a mobile device 102 is recommended to be switched back to the cellular network, the non-cellular wireless data network 106 connection is terminated, or the mobile device 102 is commanded to switch back to the cellular network.

The network response module 220 may be configured to determine whether to maintain connectivity with the non-cellular wireless data network based on the QoE score. In various embodiments, if the failure count exceeds the failure count threshold, the network response module 220 may remove the non-cellular wireless data network 106 from a list of acceptable or preferred wireless networks (e.g., the non-cellular wireless data network 106 may be removed from a network availability list of the mobile device 102).

In some embodiments, the network response module 220 directs the mobile device 102 to terminate the connection to the non-cellular wireless data network 106. Once a mobile device 102 disconnects from the non-cellular wireless data network 106 and/or is switched back to the cellular wireless network 114, the previously connected non-cellular wireless data network 106 may be marked down for a set period of time, referred to in the system as "blacklisted." After a predetermined markdown time (e.g., often 30 to 60 minutes), the system may no longer be "blacklisted" and an attempt may be made to reconnect the mobile device 102.

In some embodiments, the network response module 220 may provide an indicator of the quality of the non-cellular wireless data network 106. The indicator may be shared with the operating system of the mobile device 102 and/or other software or agents of the mobile device 102 thereby allowing other software or hardware to take action based at least partly on the quality of the non-cellular wireless data network 106. In some embodiments, the network response module 220 provides a flag indicating that the non-cellular wireless data network 106 is not of sufficient quality. In various embodiments, the network response module 220 provides an identifier indicating degree of quality and/or degree of insufficient quality of the network response module 220.

In some embodiments, the QoE score is sent to the QoE system 108 over the communication network 110 and network device 104 to record the historical quality of the non-cellular wireless data network 106.

The optional signal selection module 222 may be configured to select a network (e.g., one or more non-cellular wireless data networks 106 or cellular wireless network 114) based on the quality of the non-cellular wireless data network 106. In some embodiments, if the failure count is greater than the failure count threshold, the signal selection module 222 may direct the mobile device 102 to disconnect from the non-cellular wireless data network 106 and connect or utilize a data connection with a cellular service provider or other available Wi-Fi connection.

The communication module 224 may be configured to communicate with a non-cellular wireless data network 106 (e.g., IEEE 802.11x) and cellular wireless network 114 (LTE).

Figure 3:
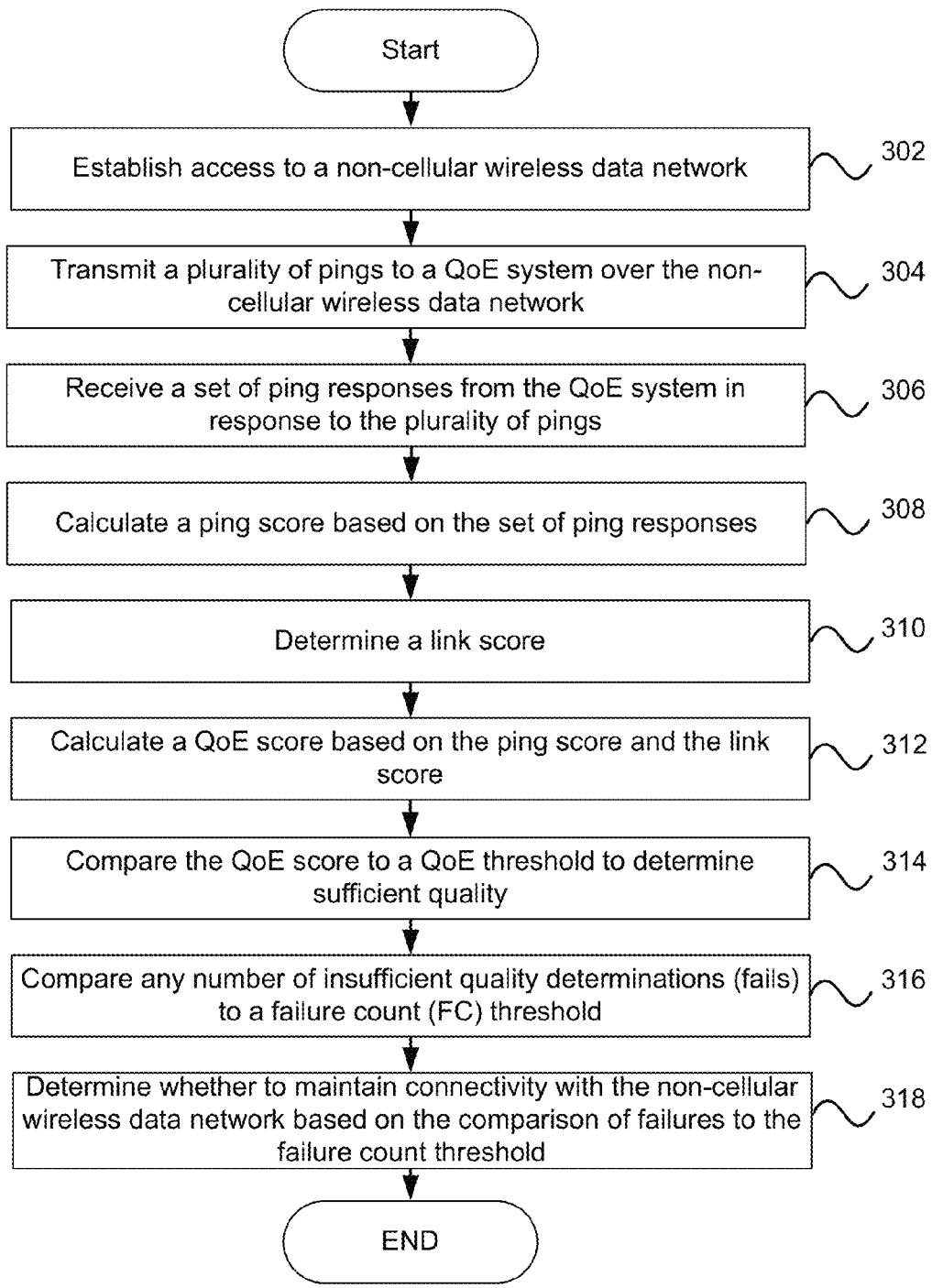
FIG. 3 is a flow chart for determining a quality of communication of a mobile device over a non-cellular wireless data network, a network device, and a communication network in some embodiments.

FIG. 3 is a flow chart for determining a quality of communication of a mobile device 102 over a non-cellular wireless data network 106, a network device 104, and a communication network 110 in some embodiments. In step 302, the scan module 202 and authentication module 204 may establish access to a non-cellular wireless data network 106.

In step 304, the ping module 206 may transmit a plurality of pings (e.g., a burst) to a QoE system over the non-cellular wireless data network 106. In some embodiments, the ping module 206 transmits the pings formatted using the UDP protocol. By formatting pings with the UDP protocol, overhead and resources may be reduced, and the ping score may represent packet loss effectively due the absence of TCP retransmission. In some embodiments, the ping module transmits 10 pings over every predetermined period of time (e.g., every 60 seconds).

In step 306, the ping module 206 receives a set of ping responses from the QoE system in response to the plurality of pings. For each ping response the network round trip time is measured.

In step 308, the ping module 206 calculates a ping score based on set of ping responses. The ping score is further described with respect to FIG. 4.

In step 310, the link module 208 determines a link score. The link score is further described with respect to FIG. 10.

In step 312, the QoE score module 210 calculates the QoE score based on the ping score and the link score. In various embodiments, the QoE score is based on the ping score but not the link score. In some embodiments, the QoE score is based on the link score but not the ping score. In some embodiments the ping and link score are not combined into one QoE score, but rather used as separate QoE scores.

In step 314, the QoE score module 210 or the QoE threshold module 212 may compare the QoE score to a QoE threshold to determine if the connectivity over the non-cellular wireless data network 106 to the communication network 110 is of sufficient quality. In one example, the FC module 216 may compare the insufficient quality determinations by the QoE score module 210 or the QoE threshold module 212 (based on comparing the QoE score with the QoE threshold). If the non-cellular wireless data network 106 is not of sufficient quality, the FC module 216 may determine a failure count (e.g., increment a failure count).

In step 316, the FC module 216 may compare a number of failures (e.g., a number of determinations that a network is of insufficient quality) to a FC threshold which is further described herein.

In step 318, the network response module 220 may determine whether to maintain connectivity with non-cellular wireless data network 106 based on comparison of failures to failure count threshold. As discussed herein, the network response module 220 may be configured to determine whether to maintain connectivity with the non-cellular wireless data network based on the QoE score. In various embodiments, if the failure count exceeds the failure count threshold, the network response module 220 may remove the non-cellular wireless data network 106 from a list of acceptable or preferred wireless networks, may direct the mobile device 102 to terminate the connection to the non-cellular wireless data network 106, or provide an indicator of the quality of the non-cellular wireless data network 106.

Figure 4:
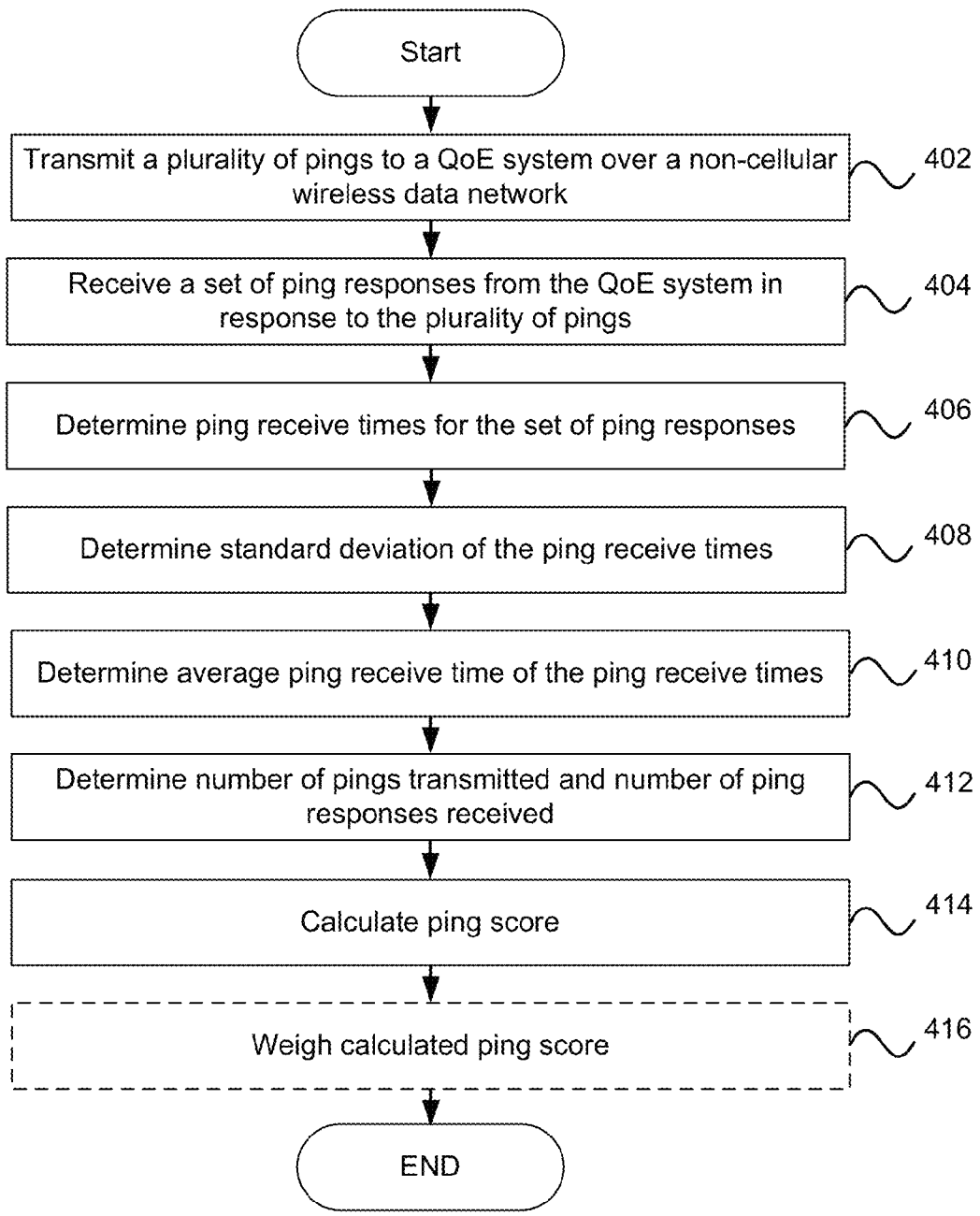
FIG. 4 is a flowchart of calculating a ping score in some embodiments.

FIG. 4 is a flowchart of calculating a ping score in some embodiments. In step 402, the ping module 206 of a mobile device 102 transmits a plurality of pings to a QoE system 108 over the non-cellular wireless data network 106, network device 104, and communication network 110. Those skilled in the art will appreciate that there may be any number of pings that are transmitted. In one example, 10 pings are transmitted.

In step 404, the ping module 206 receives a set of ping responses from the QoE system 108 in response to the transmission of the plurality of pings. In some embodiments, the QoE system 108 comprises an echo server. Any number of ping responses may be received. In some embodiments, the number of ping response is equal to or less than the number of pings transmitted of the plurality of pings.

In step 406, the ping module 206 measures the ping round-trip times from the set of ping responses.

In step 408, the ping module 206 may determine the standard deviation of ping receive times. In step 410, the ping module may determine an average ping receive time of the ping receive times. In step 412, the ping module may determine the number of pings transmitted and the number of ping response received.

In step 414, the ping module 206 calculates the ping score. A ping score may be calculated as follows:

$$\text{Ping Score} = (1 - (\text{standard deviation}/\text{ping average})) * (\text{packets received}/\text{packets sent})$$

In step 416, the ping module 206 may modify the ping score by weighing the ping score with a ping weight.

As discussed herein, the network response module 220 may wait for a number of quality failures (e.g., a number of times a QoE score indicates that the communication is of insufficient quality when compared to a QoE threshold) to surpass or equal a predetermined number of times (e.g., exceed or meet a failure count threshold) before recommending or commanding that a wireless network be disconnected.

In some embodiments, an averaging filtering is applied to the ping score to smooth out variations in the ping score. In various embodiments, the averaging filter may take the following form:

$$\text{ping score}_n = \text{ping score}_{n-1} + (\text{sampled ping score} - \text{ping\_score}_{n-1})/\text{timeconstant}$$

In some embodiments, a mobile device 102's own traffic (e.g., downloading updates, applications, streaming video, and the like) may cause a ping score to drop, potentially below the threshold of acceptance which may cause unnecessary switching of networks. In various embodiments, the QoE score module 210 may suspend transmitting the plurality of pings, determining the ping score, determining the link score, and calculating the QoE score. The QoE score module 210 may suspend any number of operations when, for example, current traffic passes through the mobile device 102 WLAN interface (e.g., communication module 224) passes a configurable traffic threshold.

Figure 5:
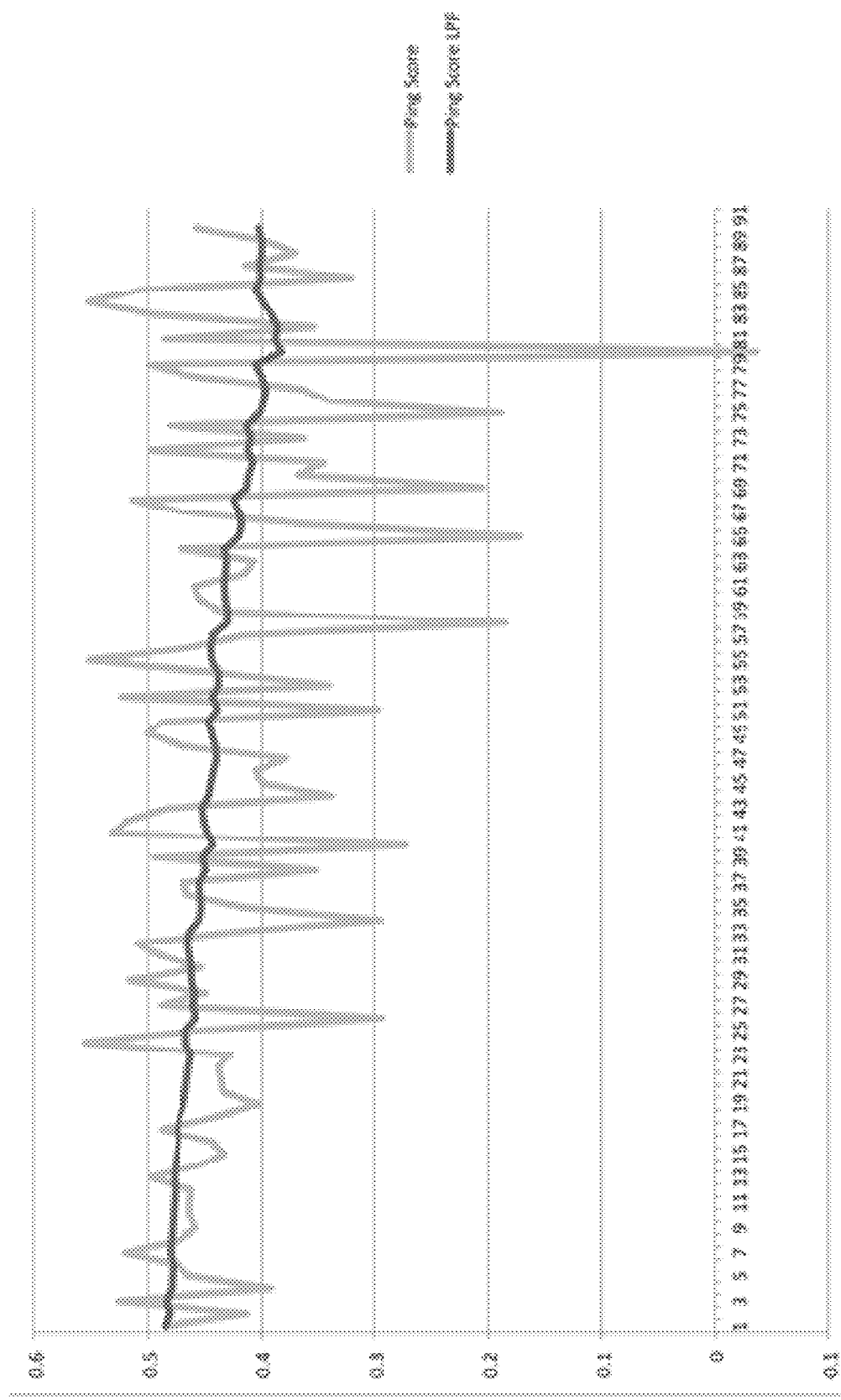
FIG. 5 depicts the ping score as the network (e.g., the communication network) becomes more congested in some embodiments.

FIG. 5 depicts the ping score as the network (e.g., the communication network 110) becomes more congested in some embodiments. The "Ping Score" may represent the raw data, while "Ping Score LPF" may show the averaging filtered results. The unfiltered results, although showing a trend, vary wildly, with clear trends and measurements discernable from the averaging filtered results.

Figure 6:
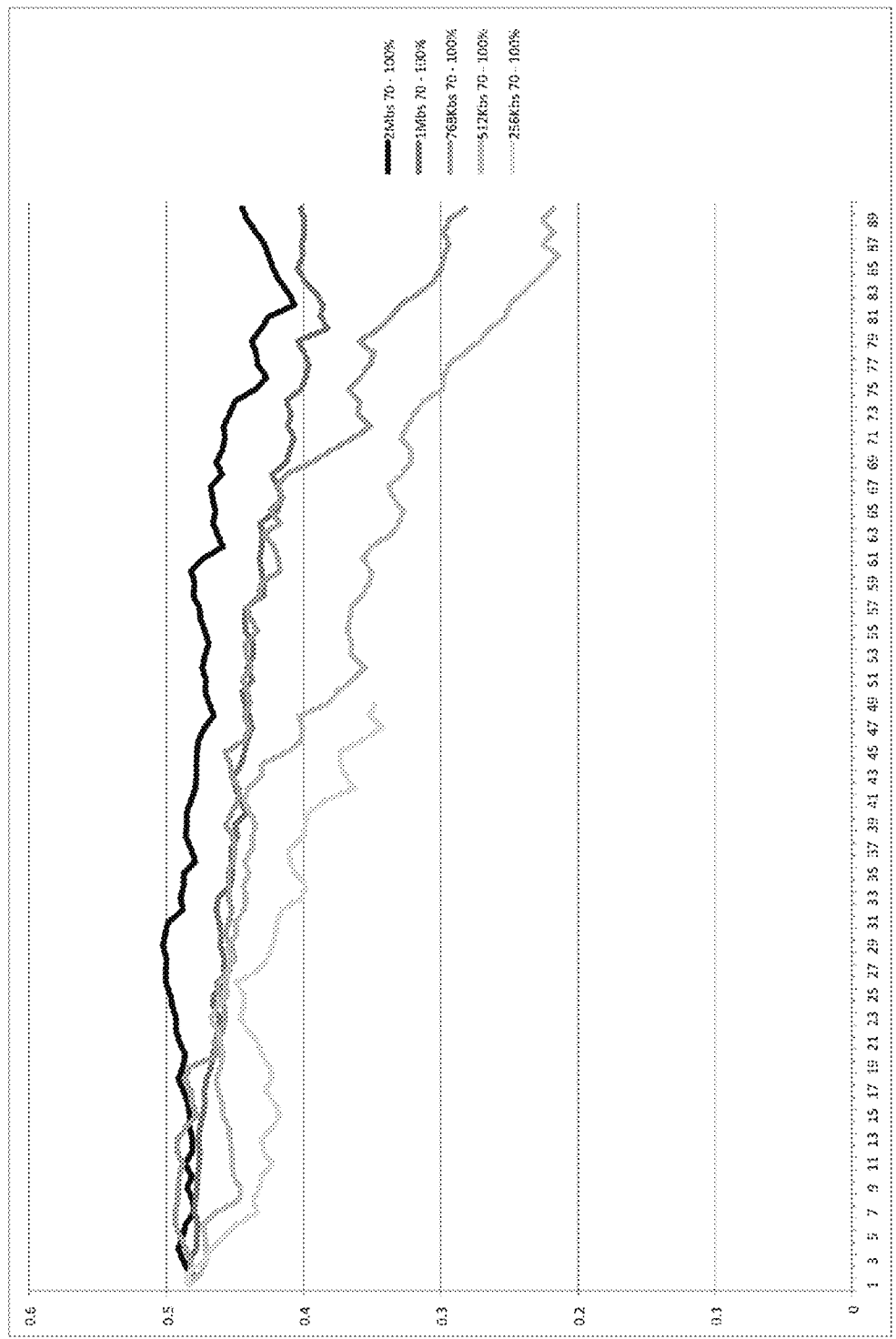
FIG. 6 depicts results from a backhaul congestion test of ping score vs. QoE sample number in some embodiments.

FIG. 6 depicts results from a backhaul congestion test of ping score vs. QoE sample number in some embodiments. Each line on the graph represents the congestion test from 70% to 100%, 15 minutes per congestion value. Six congestion ranges were used, so 90 total samples were captured, one per minute, indicated on the Y axis.

Based on the graph depicted in FIG. 6, when there is a reasonable amount of wired network bandwidth available (>2 Mbs) the ping score algorithm is insensitive to congestion, showing only a drop of 0.1 with the current weighting values. As the backhaul decreases in capacity, the algorithm may become increasingly sensitive to congestion. For example a 512 Kbs backhaul shows a range of 0.5 to 0.2 for the ping score. Note that with a 256 Kbs backhaul, once congestion reaches 90%, the QoE tests start to fail in FIG. 6 and return no results. This illustrates the QoE tests effectiveness at measuring congestion on non-cellular wireless networks with marginal capacity wired network back-haul connections.

Figure 7:
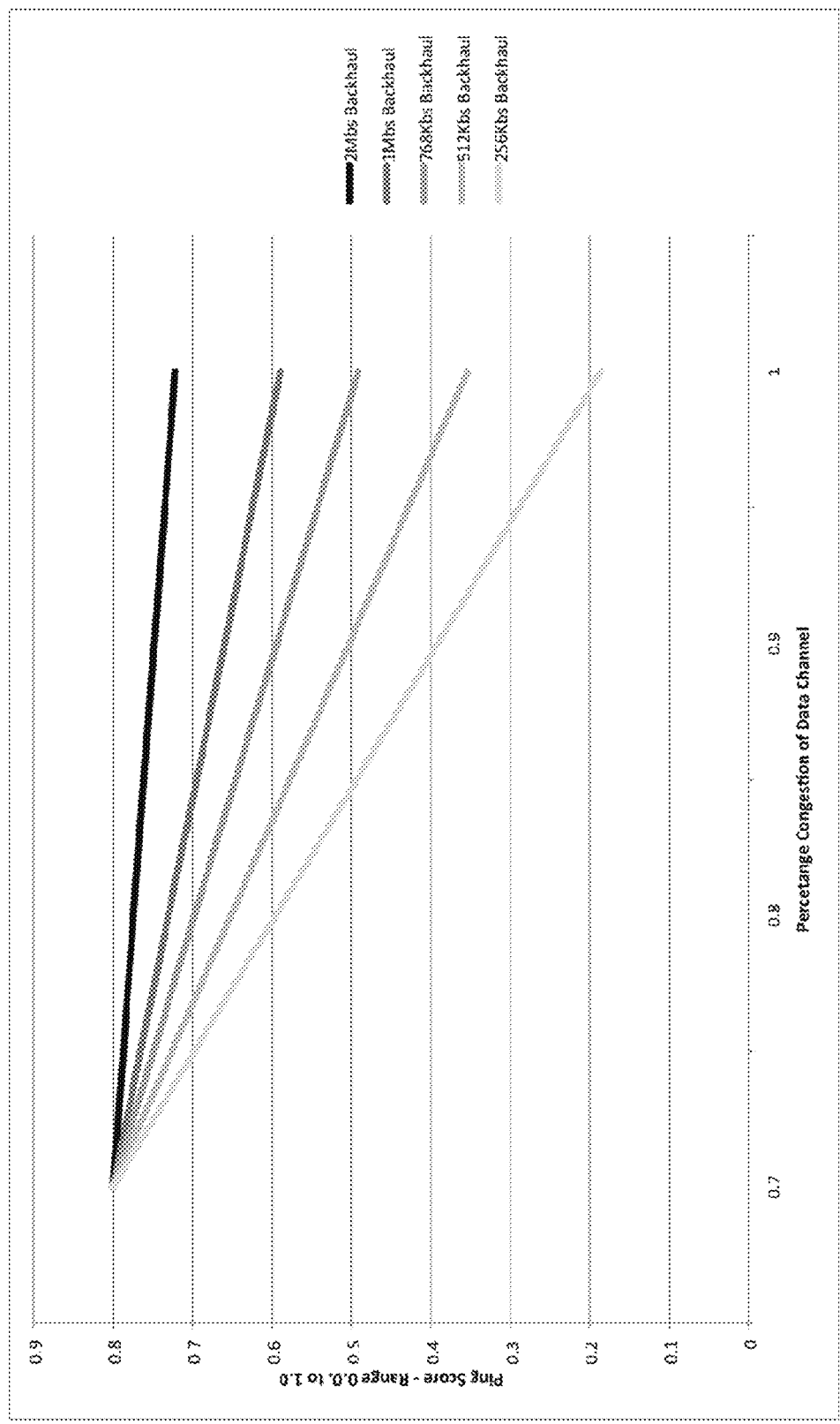
FIG. 7 depicts modelled ping score vs. backhaul capacity and channel congestion in some embodiments.

FIG. 7 depicts modelled ping score vs. backhaul capacity and channel congestion in some embodiments. In some embodiments, a mathematical model can be built to represent ping score as a function of backhaul capacity and percentage congestion in the backhaul channel. This may be performed by straight-line approximating each of the curves, since the curves are fairly flat and this avoided curve matching. The relationship of slope against backhaul capacity may be calculated using a polynomial least-square fitting.

Normalizing the ping score range to 0.0, to 1.0, this yields the following formula for ping score:

Ping Score=$(C-0.7)(-0.783*B^2+2.79 \times B-2.71)+0.8$

Where: C=Congestion as a decimal (70%=0.7), and B=Backhaul capacity in Mbs

FIG. 7 shows a plot of the ping score formula over its valid range of 70% to 100% network congestion.

Figure 8:
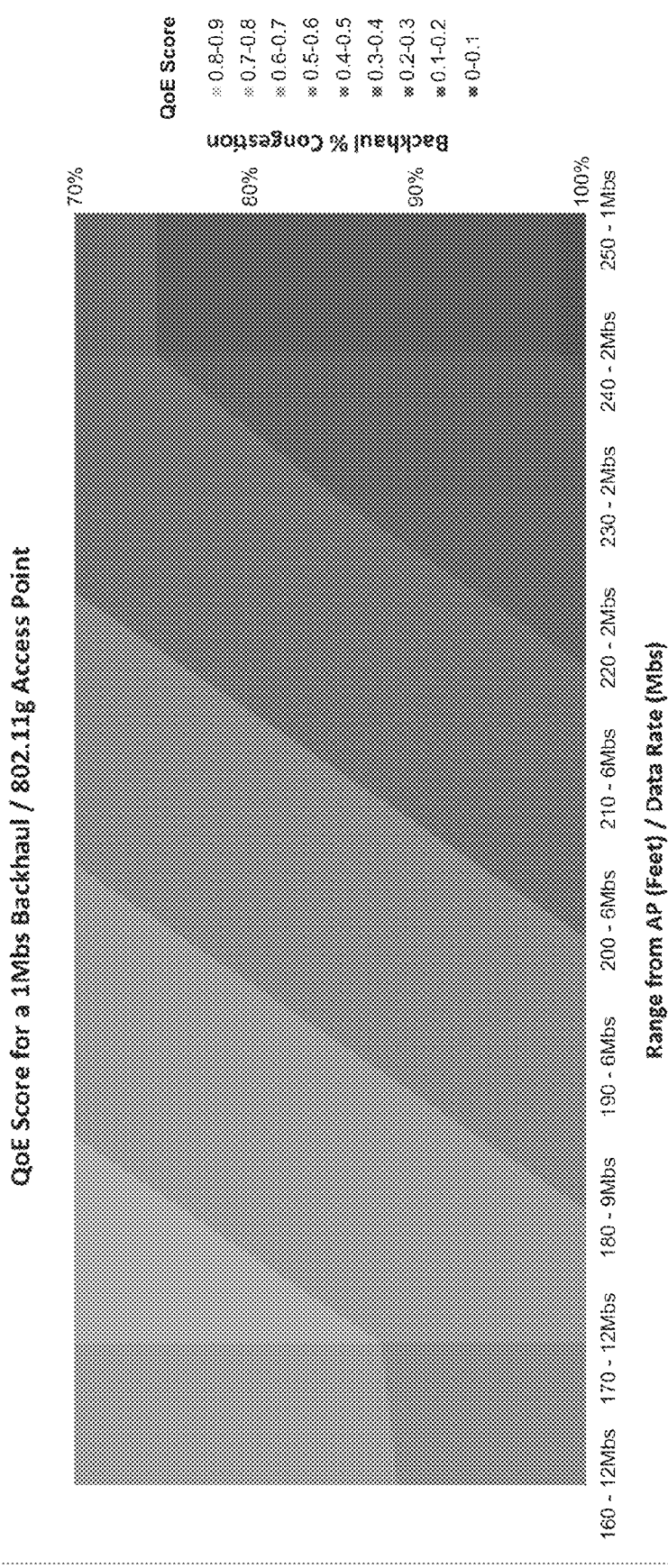
FIG. 8 is an exemplary combined contour graph of QoE score vs. percentage backhaul congestion, the distance a digital device is from a Wi-Fi hotspot, and the Wi-Fi data rate in some embodiments

FIG. 8 is an exemplary combined contour graph of QoE score vs. percentage backhaul congestion, the distance a digital device is from a Wi-Fi hotspot, and the Wi-Fi data rate in some embodiments. The exemplary graph illustrates that as the digital device moves further from the Wi-Fi hotspot, and as congestion increases, the QoE score decreases. The graph is for an 802.11g access point with a 1 Mbs backhaul.

Figure 9:
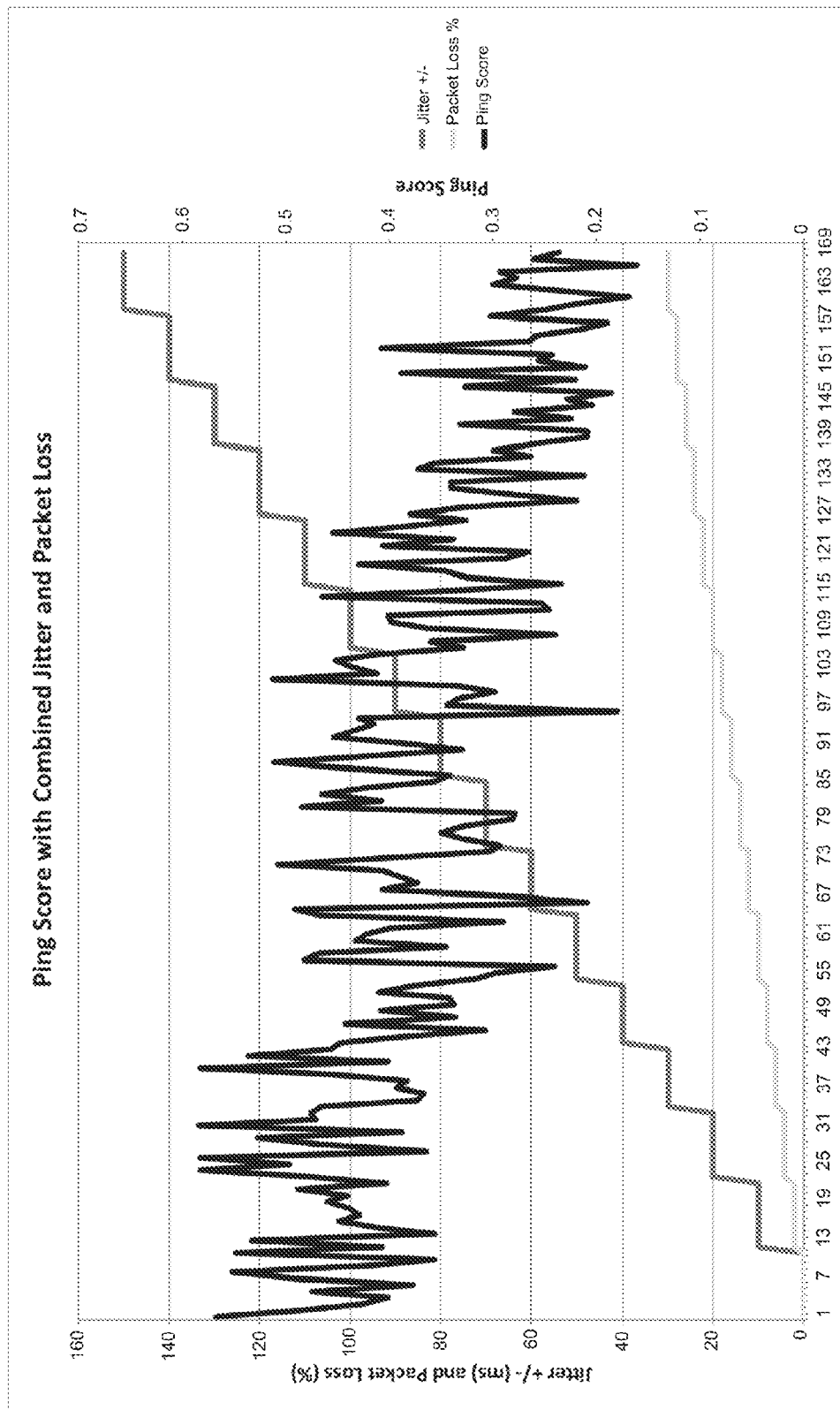
FIG. 9 is an exemplary graph showing how the ping score may decrease as both network packet loss and jitter increase in some embodiments.

FIG. 9 is an exemplary graph showing how the ping score may decrease as both network packet loss and jitter increase in some embodiments.

Figure 10:
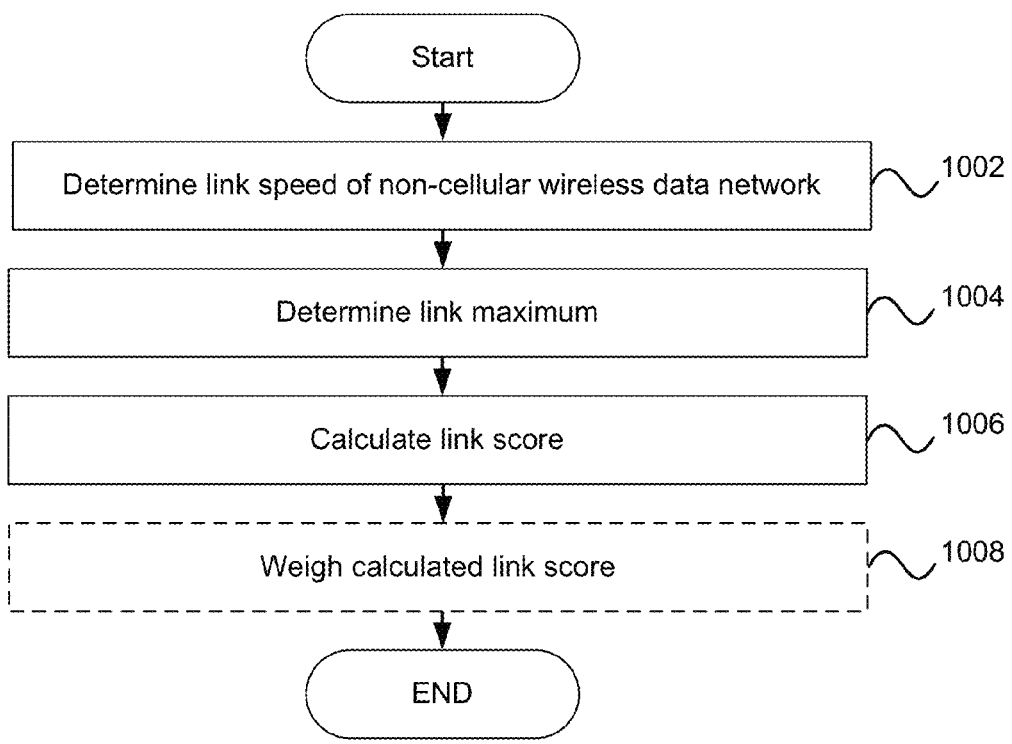
FIG. 10 is a flowchart for determining a link score in some embodiments.

FIG. 10 is a flowchart for determining a link score in some embodiments. In step 1002, the link module 208 determines a link speed of the non-cellular wireless data network 106. In step 1004 the link module 208 determines a link maximum. In step 1006, the link module 208 calculates a link score.

The link score may be calculated as follows:

Link Score=minimum((link speed/link maximum), 1.0)

In optional step 1008, the link score may be weighted by a multiplying the link score with a link weight. In various embodiments, after testing the link calculations, a link weight of 0.4 may be used. Those skilled in the art will appreciate that any ping weight may be used.

In various embodiments, the higher the packet loss and the lower the SINR, the lower the data rate, typically indicating that the mobile device 102 is either a long way from the network device 104 and subject to signal fading, that there is interference from other sources, or that there is packet loss caused by fading or network collisions.

Figure 11:
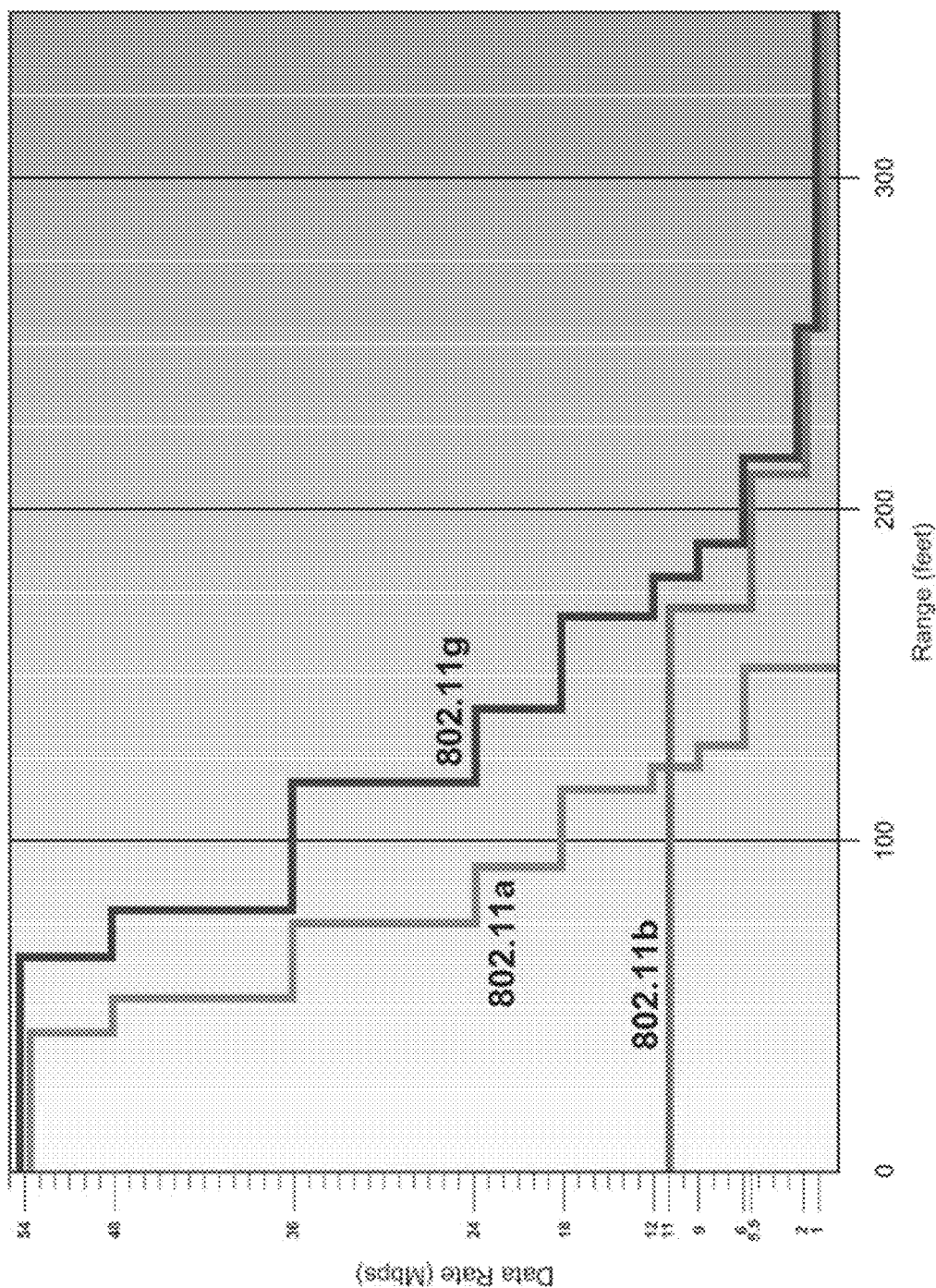
FIG. 11 is a graph of Wi-Fi 802.11 range vs. rate curves for different Wi-Fi technologies in some embodiments.

In various embodiments, the resulting rates vs. range graphs may follow the format in FIG. 11, which is a study of range vs. rate for various Wi-Fi technologies, or "PHYs", from Broadcom 802.11g marketing material.

In some embodiments, the Link Maximum, the link speed that is considered acceptable quality, has a value of 10 Mbs. As a result, any link speed greater than 10 will score the maximum link score—for a link weight of 0.4, this would result in a link score of 0.4.

Figure 12:
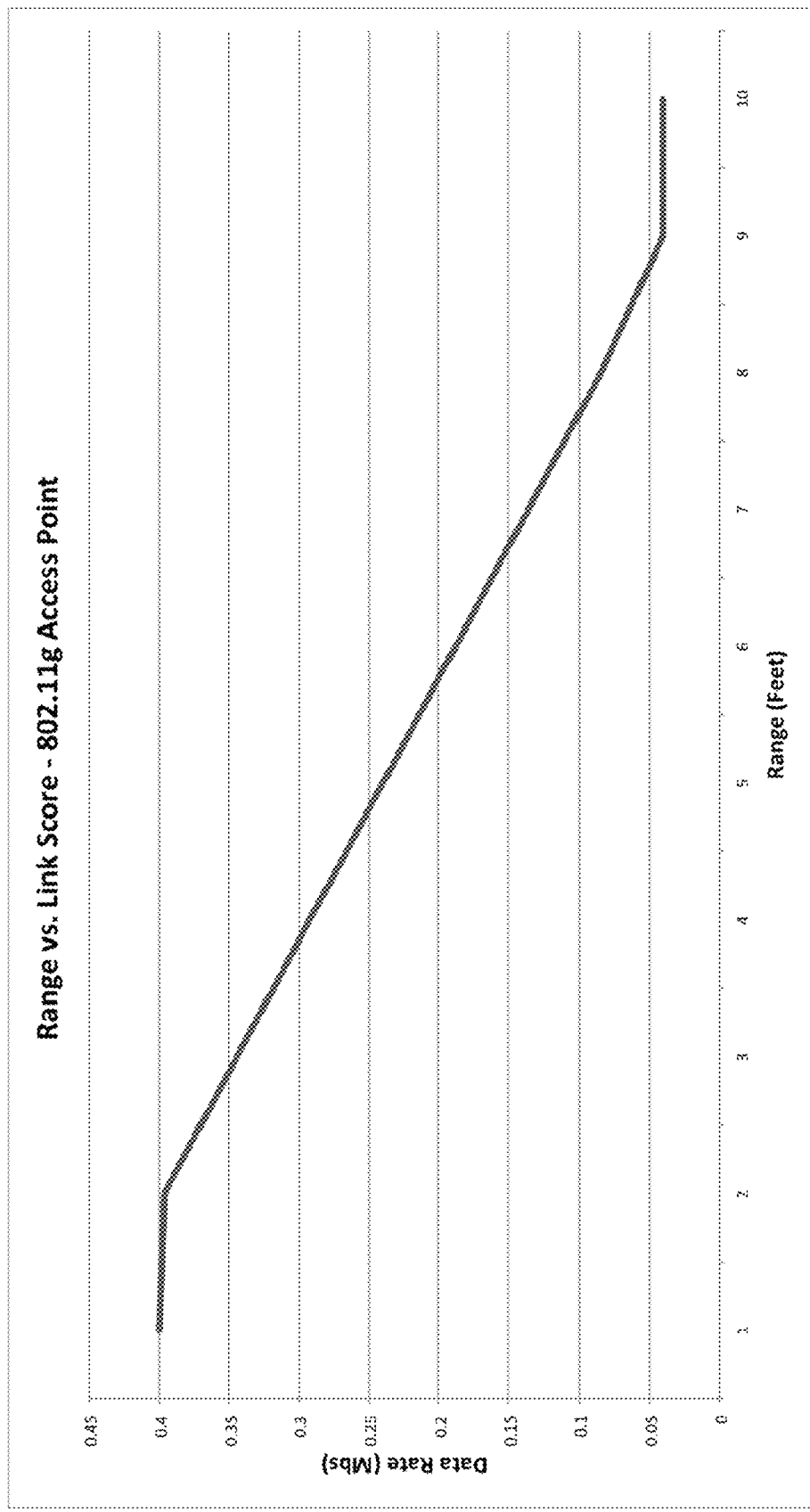
FIG. 12 is a graph of link score vs. range from an access point (e.g., network device) in some embodiments.

Using the rate vs. range plot in FIG. 12, the link module may derive the link score as a function of the distance from the access point bounded by 160 to 250 feet as:

Data Rate=$-0.13*$Range+32

Where Data Rate is in Mbs, and Range is in feet.

So, in some embodiments, link score=$(-0.13*$Range+32$)/$Link Maximum which is plotted in FIG. 12, showing both data rate and link score for Link Maximum=10 Mbs, and the link weight of 0.4.

In various embodiments, the link module 208 calculates a degrading score value once a mobile device 102 moves into a marginal signal area where the non-cellular wireless data network 106 data rate falls below 10 Mbs (when link maximum=10) and when, for example with an 802.11g network, the distance from the network device 104>~160 ft in an unrestricted environment. Note the range window presented herein may change depending on the 802.11 PHY (i.e., b/g/n/ac).

Those skilled in the art will appreciate that a different link maximum may be utilized based, in part, on the Wi-Fi PHY (i.e., b/g/n/ac). In some embodiments, the link module 208 may assess the non-cellular wireless data network 106 to determine the Wi-Fi PHY in order to determine a link maximum. In one example, the link module 208 receives information regarding the Wi-Fi PHY from an operating system or an agent on the mobile device 102.

FIG. 11 is a graph of Wi-Fi 802.11 range vs. rate curves for different Wi-Fi technologies in some embodiments.

FIG. 12 is a graph of 802.11 data rate and link score vs. range from an access point (e.g., network device 104) in some embodiments.

Figure 13:
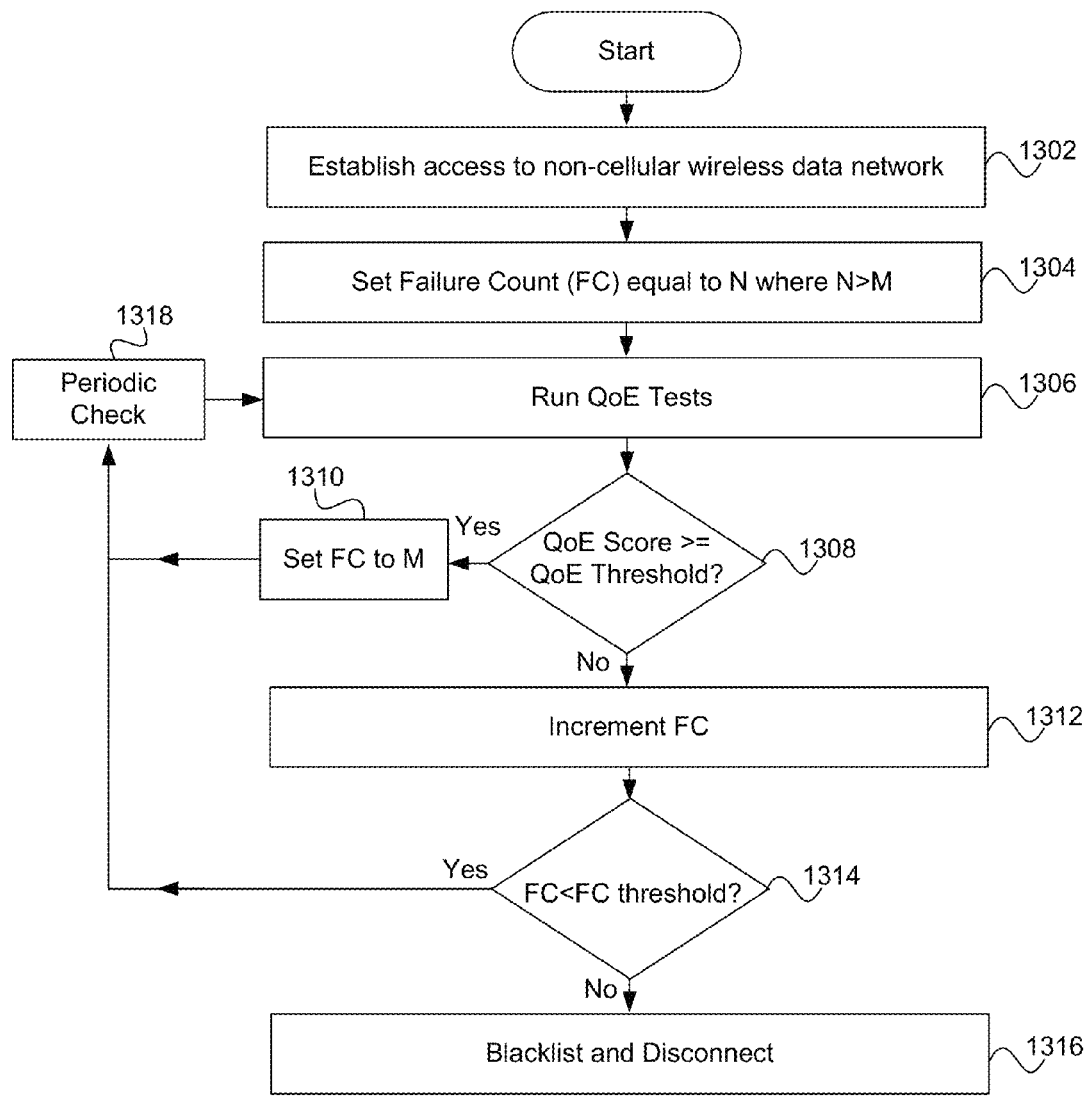
FIG. 13 is a flowchart for adjusting a QoE threshold and blacklisting a non-cellular wireless data network when a failure count exceeds a failure count threshold in some embodiments.

FIG. 13 is a flowchart for adjusting a QoE threshold and blacklisting a non-cellular wireless data network 106 when a failure count exceeds a failure count threshold in some embodiments. In step 1302, a mobile device 102 establishes access over a non-cellular wireless data network 106 with a network device 104 to access a communication network 110. In one example, the scan module 202 of a mobile device 102 scans an area for a network device 104. The authentication module 204 may retrieve network credentials or a user may provide network credentials to the network device 104. Based on the network credentials, the network device 104 may provide permission for the mobile device 102 to access the communication network 110.

In step 1304, the FC module 216 sets a failure count to N where N is greater than M. In one example, N is an initial failure count and M is an adjusted failure count after a predetermined number of tests indicating sufficient quality. In one example, where N=5 then if there are five consecutive quality failures, the mobile device 102 may terminate the connection with the network device 104 and/or the non-cellular wireless data network 106. Further, the mobile device 102 may disconnect from the network device 104 and/or the non-cellular wireless data network 106.

In step 1306, the QoE score module 210 may run QoE tests. In one example, the ping module 206 may calculate a ping score and the link module 208 may calculate a link score as described herein. The QoE score module 210 may then calculate the QoE score based on the ping score and/or the link score.

In step 1308, the QoE score module 210 may compare the QoE score with the QoE threshold. If the QoE score calculated in step 1306 is of sufficient quality (e.g., the QoE score is equal to or greater than the QoE threshold) then the failure count adjustment module 218 may set the failure count to M. Those skilled in the art will appreciate that the QoE score may be compared to the QoE threshold in any number of ways to determine a quality of communication. If the QoE score calculated in step 1306 is not of sufficient quality (e.g., the QoE score is less than the QoE threshold) then the failure count module 216 may change (e.g., increment) the failure count in step 1312.

In step 1314, the failure count module 216 may compare the failure count to the failure count threshold (e.g., the failure count module 216 may determine if a number of failures exceed the failure count threshold). If the quality of communication has failed over a predetermined period of times (e.g., the failure count meets or exceeds the thresholds), the network response module 220 may blacklist the network device 104 and/or the non-cellular wireless data network 106. The network response module 220 may also disconnect the mobile device 102 from the network device 104 and/or the non-cellular wireless data network 106.

If the QoE score indicates sufficient quality in step 1308 and/or the failure count indicates that there have not been sufficient failures to disconnect the mobile device 102, then the QoE score module 210 may wait a predetermined period of time (e.g., 1 minute) in step 1318 before running the QoE tests again in step 1306.

In various embodiments, the "blacklisting" of a non-cellular wireless data network 106 is limited to the mobile device 102 that was previously communicating over the non-cellular wireless data network 106 (i.e., other mobile devices that use or may use the same non-cellular wireless data network 106 may be unaffected by the "blacklist" determination). In some embodiments, a "blacklist" determination may be shared with a server (e.g., cached until a network connection is made and then provided to the server). In some embodiments, the server is a curation server. The server may track the "blacklist" determination and take a number of "blacklist" determinations by any number of mobile devices into account before determining to recommend the related non-cellular wireless data network 106 (or determining to not recommend the related non-cellular wireless data network 106). In some embodiments, the QoE score is shared with a server so the server can calculate the average quality of the non-cellular network (e.g., quality of the non-cellular wireless data network 106 and/or communication network 110) from a plurality of measurements. In one embodiment this server is the QoE system 108. In another embodiment this server is a curation server. The curation server is further described by U.S. patent Ser. No. 13/396,552, entitled "Systems and Methods for Network Curation," filed Feb. 14, 2012, which is incorporated by reference herein.

Figure 14:
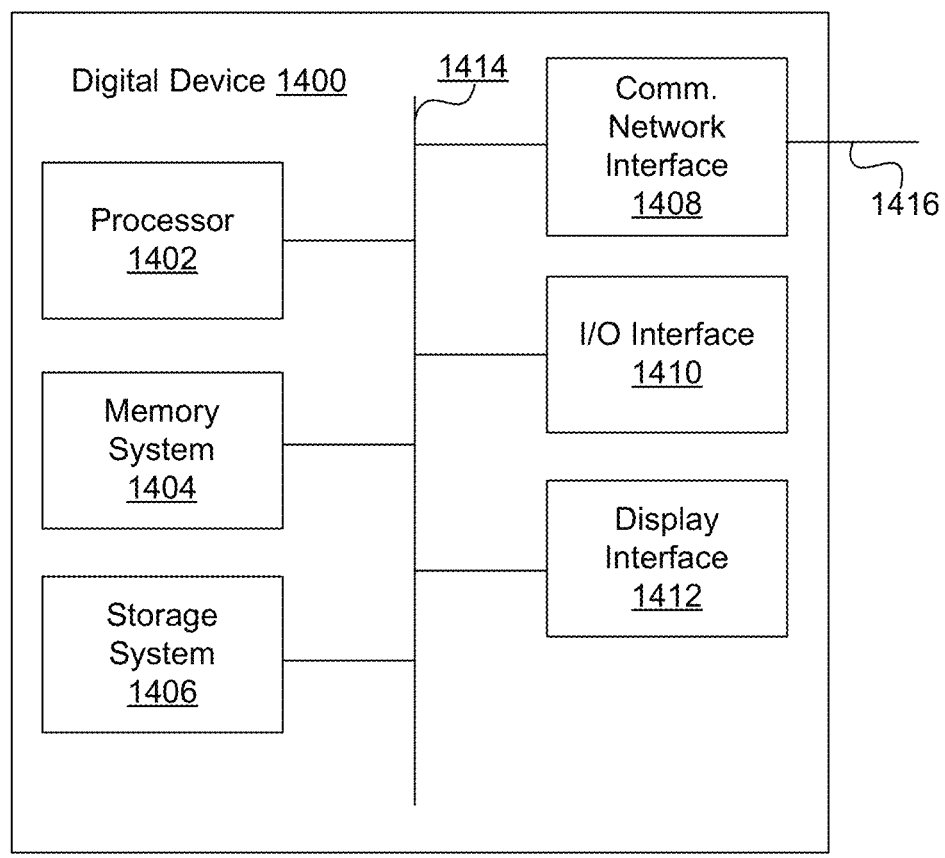
FIG. 14 is a block diagram of an exemplary digital device.

FIG. 14 is a block diagram of an exemplary digital device. The digital device 1400 comprises a processor 1402, a memory system 1404, a storage system 1406, an I/O interface 1410, a communication network interface 1408, and a display interface 1412. The processor 1402 is configured to execute executable instructions (e.g., programs). In some embodiments, the processor 1402 comprises circuitry or any processor capable of processing the executable instructions.

The memory system 1404 is any memory configured to store data. Some examples of the memory system 1404 are storage devices, such as RAM or ROM. The memory system 1404 can comprise the ram cache. In various embodiments, data is stored within the memory system 1404. The data within the memory system 1404 may be cleared or ultimately transferred to the storage system 1406.

The storage system 1406 is any storage configured to retrieve and store data. Some examples of the storage system 1406 are flash drives, hard drives, optical drives, and/or magnetic tape. In some embodiments, the credential server 116 digital device 1400 includes a memory system 1404 in the form of RAM and a storage system 1406 in the form of flash data. The storage system 1406 may comprise nontransitory computer readable media that may store instructions executable by a processor. Both the memory system 1404 and the storage system 1406 comprise computer readable media which may store instructions or programs that are executable by a computer processor including the processor 1402.

The optional input/output (I/O) interface 1406 is any device that receives input from the user and output data. The optional display interface 1410 is any device that is configured to output graphics and data to a display. In one example, the display interface 1410 is a graphics adapter. It will be appreciated that not all digital devices 102 comprise either the I/O interface 1406 or the display interface 1410.

The communication network interface (com. network interface) 1408 can be coupled to a network via the link 1412. In various embodiments, the communication network interface 1408 comprises two antennas including a first antenna to communicate over a cellular wireless network 114 and a second antenna to communicate over a non-cellular wireless data network 106. The communication network interface 1408 may support communication over an Ethernet connection, a serial connection, a parallel connection, or an ATA connection, for example. The communication network interface 1408 may also support wireless communication (e.g., 802.11 a/b/g/n, WiMax). It will be apparent to those skilled in the art that the communication network interface 1408 can support many wired and wireless standards. The communication network interface 1408 may also support communication over a cellular wireless network 114 (e.g., the communication network interface 1408 may support communication over LTE, 3G, Wimax, or the like).

The present invention(s) described above with reference to exemplary embodiments. It will be apparent to those skilled in the art that various modifications may be made and other embodiments can be used without departing from the broader scope of the present invention(s). Therefore, these and other variations upon the exemplary embodiments are intended to be covered by the present invention(s).

The invention claimed is:

1. A method performed by a digital device, the method comprising:
    connecting to a non-cellular wireless data network, the digital device capable of communicating over a cellular network;
    determining if the digital device has previously connected to the non-cellular wireless data network over a predetermined period of time, and if the digital device has not previously connected to the non-cellular wireless data network over the predetermined period of time, then changing a failure count threshold from an initial value to a different value;
    transmitting a plurality of pings to a Quality of Experience (QoE) system accessible over the non-cellular wireless data network;
    receiving a set of ping responses from the QoE system in response to the plurality of pings;
    calculating a plurality of QoE scores based on the set of ping responses;
    comparing each of the plurality of QoE scores to a QoE threshold and changing a failure count for each of the plurality of QoE scores that fails to satisfy the QoE threshold based on the comparison;
    comparing the failure count to the failure count threshold; and
    determining whether to maintain connectivity with the non-cellular wireless data network based on the comparison of the failure count to the failure count threshold.

2. The method of claim 1, wherein each of the plurality of pings is formatted using User Datagram Protocol (UDP).

3. The method of claim 1, wherein round trip times are calculated for each of the plurality of pings.

4. The method of claim 1, further comprising providing, based on the determination whether to maintain connectivity with the non-cellular wireless data network, a network response to assist in terminating connectivity with the non-cellular wireless data network.

5. The method of claim 4, further comprising removing a listing of the non-cellular wireless data network from a list of available networks.

6. The method of claim 1, wherein determining whether to maintain connectivity with the non-cellular wireless data network based on the comparison of the failure count to the failure count threshold comprises determining that a quality of the non-cellular wireless data network is satisfactory.

7. The method of claim 1, wherein calculating at least one of the plurality of QoE scores based on the set of ping responses comprises calculating a ping score based, at least in part, on a standard deviation and average of round trip times associated with at least some of the set of ping responses.

8. The method of claim 7, wherein calculating the ping score comprises the standard deviation divided by the average.

9. The method of claim 7, wherein the ping score is multiplied by a total number of pings received divided by a total number of pings sent.

10. The method of claim 1, wherein calculating at least one of the plurality of QoE scores based on the set of ping responses comprises calculating a link score based on a link speed and a maximum link between the digital device and a network device which provides the digital device access to the non-cellular wireless data network.

11. The method of claim 10, wherein calculating the at least one of the plurality of QoE scores based on the set of ping responses comprises calculating the at least one of the plurality of QoE scores based on a ping score and the link score, wherein the ping score is based, at least in part, on a standard deviation and average of round trip times associated with the set of ping responses.

12. The method of claim 1, wherein the plurality of QoE scores are based on a plurality of ping transmissions and a plurality of sets of ping responses, the plurality of sets of ping responses being based on the plurality of ping transmissions.

13. The method of claim 1, further comprising providing a network response to assist in terminating connectivity with the non-cellular wireless data network based on the determination whether to maintain connectivity with the non-cellular wireless data network.

14. A digital device, comprising:
a communication interface configured to assist in connecting to a non-cellular wireless data network and a cellular wireless network;
a failure count adjustment module configured to determine if the digital device has previously connected to the non-cellular wireless data network over a predetermined period of time, and if the digital device has not previously connected to the non-cellular wireless data network over the predetermined period of time, then the failure count adjustment module is further configured to change a failure count threshold from an initial value to a different value;
a ping module configured to transmit a plurality of pings to a Quality of Experience (QoE) system accessible over the non-cellular wireless data network and receive a set of ping responses from the QoE system in response to the plurality of pings;
a QoE score module configured to calculate a plurality of QoE scores based on the set of ping responses;
a QoE threshold module configured to compare each of the plurality of QoE scores to a QoE threshold and change a failure count for each of the plurality of QoE scores that fails to satisfy the QoE threshold based on the comparison;
a failure count module configured to compare the failure count to the failure count threshold; and
a network response module configured to determine whether to maintain connectivity with the non-cellular wireless data network based on the comparison of the failure count to the failure count threshold.

15. The digital device of claim 14, wherein each of the plurality of pings is formatted using User Datagram Protocol (UDP).

16. The digital device of claim 14, wherein round trip times are calculated for each of the plurality of pings.

17. The digital device of claim 14, wherein the network response module is further configured to provide, based on the determination whether to maintain connectivity with the non-cellular wireless data network, a network response to assist in terminating connectivity with the non-cellular wireless data network.

18. The digital device of claim 17, wherein the network response module is further configured to remove a listing of the non-cellular wireless data network from a list of available networks.

19. The digital device of claim 14, wherein the network response module configured to determine whether to maintain connectivity with the non-cellular wireless data network based on the comparison of the failure count to the failure count threshold comprises the network response module configured to determine that a quality of the non-cellular wireless data network is satisfactory.

20. The digital device of claim 14, wherein the QoE score module configured to calculate at least one of the plurality of QoE scores based on the set of ping responses comprises the QoE score module configured to calculate a ping score based, at least in part, on a standard deviation and average of round trip times associated with at least some of the set of ping responses.

21. The digital device of claim 20, wherein the QoE score module configured to calculate the ping score comprises the QoE score module configured to calculate the standard deviation divided by the average.

22. The digital device of claim 20, wherein the QoE score module configured to calculate the ping score comprises the QoE score module configured to multiply the ping score by a total number of pings received divided by a total number of pings sent.

23. The digital device of claim 14, wherein the QoE score module configured to calculate at least one of the plurality of QoE scores based on the set of ping responses comprises the QoE score module configured to calculate a link score based on a link speed and a maximum link between the digital device and a network device which provides the digital device access to the non-cellular wireless data network.

24. The digital device of claim 23, wherein the QoE score module configured to calculate at least one of the plurality of QoE scores based on the set of ping responses comprises the QoE score module configured to calculate the at least one of the plurality of QoE scores based on a ping score and the link score, wherein the ping score is based, at least in part, on a standard deviation and average of round trip times associated with the set of ping responses.

25. The digital device of claim 14, wherein the plurality of QoE scores are based on a plurality of ping transmissions and a plurality of sets of ping responses, the plurality of sets of ping responses being based on the plurality of ping transmissions.

26. The digital device of claim 25, wherein the network response module is further configured to provide a network response to assist in terminating connectivity with the non-cellular wireless data network based on the comparison of the failure count to the failure count threshold.

27. A non-transitory computer readable medium comprising executable instructions, the instructions executable by a processor to perform a method, the method comprising:
- connecting a digital device to a non-cellular wireless data network, the digital device capable of communicating over a cellular network;
- determining if the digital device has previously connected to the non-cellular wireless data network over a predetermined period of time, and if the digital device has not previously connected to the non-cellular wireless data network over the predetermined period of time, then changing a failure count threshold from an initial value to a different value;
- transmitting a plurality of pings to a Quality of Experience (QoE) system accessible over the non-cellular wireless data network;
- receiving a set of ping responses from the QoE system in response to the plurality of pings;
- calculating a plurality of QoE scores based on the set of ping responses;
- comparing each of the plurality of QoE scores to a QoE threshold and changing a failure count for each of the plurality of QoE scores that fails to satisfy the QoE threshold based on the comparison;
- comparing the failure count to the failure count threshold; and
- determining whether to maintain connectivity with the non-cellular wireless data network based on the comparison of the failure count to the failure count threshold.

* * * * *